Patented July 21, 1931

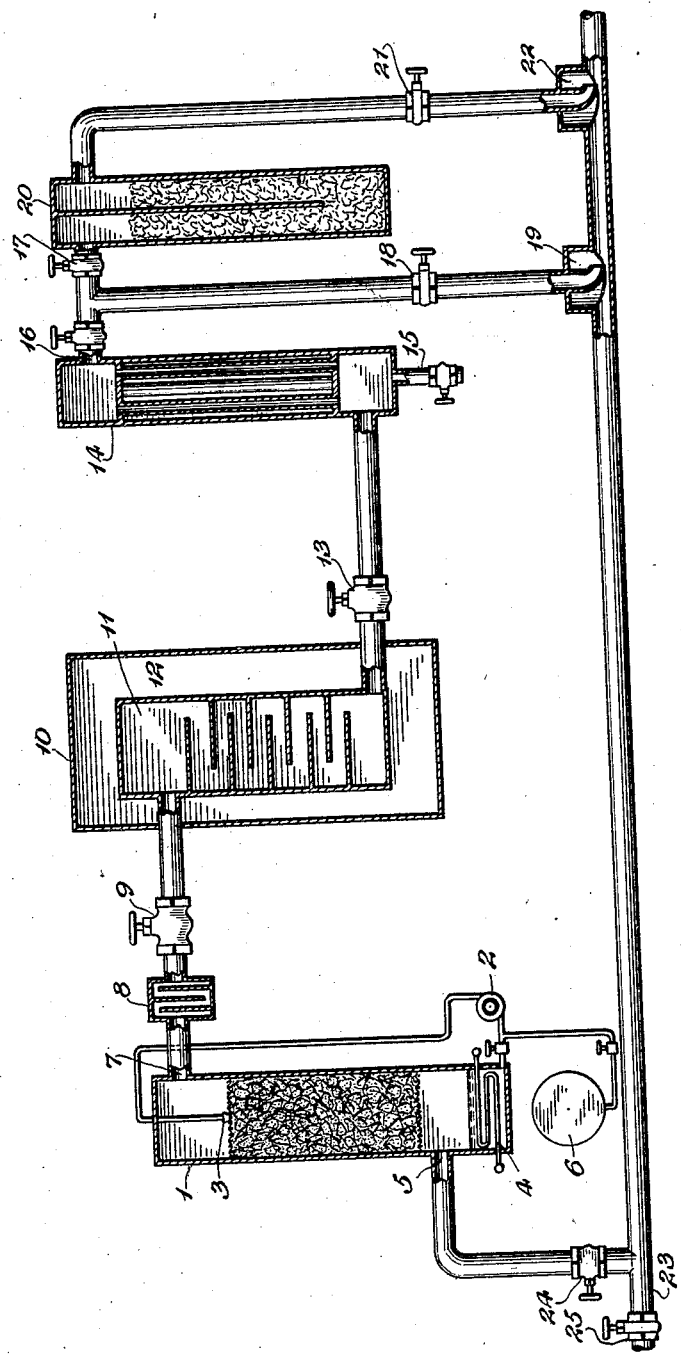

1,815,851

UNITED STATES PATENT OFFICE

EMERIC KROCH, OF NEW YORK, N. Y.

PROCESS FOR PRODUCING CARBON BLACK

Application filed May 3, 1927. Serial No. 188,563.

This invention relates to the manufacture of carbon black from natural gas and other gaseous mixtures of which the chief component is methane.

It is well known that present methods of manufacturing carbon black, gas black or lamp black, which are based upon the principle of incomplete combustion give excellent products. However, the yield of carbon black from a given quantity of gas is very low and unsatisfactory, and as a consequence the product, though excellent, is very high priced. The yield of carbon black by the present known methods of production by incomplete combustion vary from 0.8 to 1.5 pounds per 1,000 cubic feet of gas.

The other classes of known methods of producing carbon black which are based upon the principles of thermal decomposition of the natural gas, with or without the use of catalytic or chemical reagents, give in certain instances considerably higher yields than 0.8 to 1.5 pounds per 1,000 cubic feet of gas, but the quality of the product is poor and its price is several times lower than the carbon black obtained by the combustion methods.

The present invention is an improvement in the operation of the old system carbon black process based upon the direct combustion principle, and which alone is able to produce a high grade carbon black. The basis of the present invention is an enriching of the original gas in higher hydrocarbons, particularly in ethane and ethylene, the presence of which in the natural gas has been found responsible for the plant records showing yields of 1.3 to 1.5 pounds per 1,000 cubic feet of gas.

The present invention has for one of its objects the enrichment of the original or natural gas or of gas containing methane with ethane, ethylene or an ethane-ethylene mixture or other light hydrocarbons heavier than methane, and particularly such hydrocarbons which are prepared in accordance with the cracking process herein described, and forming another object of the present invention. The source of these hydrocarbons is the cracking gases produced by cracking of any mineral crude or residual oils, or similar oils under special conditions of temperature, pressure and particularly of the atmosphere, or gaseous phase, which affect the equilibrium of the cracking reaction, according to the laws of chemical equilibrium, in such a manner that constituents of the gas or chemical compounds are brought into being which are capable of yielding great quantities of carbon black per unit volume when applied to the production thereof.

I have found that by loading methane or natural or other gas containing methane, especially gases containing a high percentage of methane, with vaporized mineral oil and passing the mixture through a convenient cracking device that a high content of ethane and ethylene will appear in the gas mixture after cracking. The presence of methane in the cracking reaction affects the chemical equilibrium in the direction of a high ethane-ethylene yield. By mixing the gas so prepared with untreated original gas, a gas mixture results which has been found to give 20 to 60% higher yields of carbon black than the original gas when subsequently burnt by known methods of producing carbon black by combustion. The gas mixture resulting from the cracking operation may be directly burned for producing carbon black without mixing with original, natural, or methane containing gas.

A further description of the invention will now be undertaken with reference to the accompanying drawing which shows diagrammatically the apparatus used. In the drawing the numeral 1 indicates a carburetor in which heavy hydrocarbons for example crude mineral oils, or residual oils, or like oils are heated by the steam coil 4, or other suitable heating means. The carbureting oil from the tank 6 is pushed through the carburetor 1 by means of the pump 2. If desired a recirculation of a part of the liquid can be effected by means of the pump and its pipe connections with the base of the carburetor. The spray nozzle 3 having the purpose to pulverize the oil is situated near the top of the carburetor. The oil thus passes from the tank 6 and eventually from the base of the column to the header 3 in a substantially continuous manner. The carburetor can be filled with a suitable baffling material. The natural or other gas enters at 5 from a branch of the main gas line 23. The oil in the carburetor should be maintained at such a temperature that volatile parts suitable for the subsequent cracking operation are charged into the gas. In the case of crude oil or oil residue, this temperature may be from about 80 to 250° C.

The gas leaves the carburetor at 7 and enters a trap 8 for arresting particles of unvaporized oil which may be mechanically carried along with the gas. From the trap 8 the gas charged with vapor passes through an automatic pressure regulating valve 9 and then enters the cracking furnace 10 where the transformation of the higher hydrocarbons into the lighter ones and principally into ethane and ethylene takes place. The proportion of heavy hydrocarbons to natural or other gas may be about from 1 to 12 pounds per 1,000 cubic feet upon entering the cracking chamber 10. The absolute pressure in the cracking chamber may range from about 0.2 to 5 atmospheres while the temperature may vary from 750 to 1200° C. Under these conditions of operation natural gas may be giving an ethane-ethylene content of about 10 to 40% whereas, the original gas may have contained only 0 to 5%.

The cracking device may be of any proven construction utilizing heated bodies. The cracking device 10 shown in the drawing is provided with an outside heating chamber 12 for the passing of heating gases and an inside heating or cracking chamber 11, containing sections for inducing uniform heating of the gases during the cracking operation. The outlet of the cracking chamber is controlled by automatic valve 13, for maintaining the desired pressure within the chamber 11. After passing through the automatic valve 13 the gases pass through the cooler 14 for removing condensible constitutents if any, and for bringing the gas down to suitable conditions of temperature which is below 250° C. A part of the heat of the gases can be better utilized for preheating of the gas in 10. Any condensed constitutents in 14 are removed through the valve controlled pipe 15. The gas then leaves the coolers at 16 and enters either directly through the valve 18 and the mixer 19 into the gas line, or, through the valve 17 into the purifier 20 and then through the valve 21 and the mixer 22 into the gas line. The purpose of purification is to remove if present such constitutents of the gas mixture which could be detrimental for obtaining a high grade of carbon black. The removal of such constituents, for example of the sulphur compounds, is effected by means of suitable liquid or solid absorbents as commonly used for gas purification. The valves in the various pipes may be used to produce the flow of gases desired. The valves 24 and 25 may be used to control the volume of gas passing through the main line 23 and the branch line leading to the carburetor 1.

The ethane-ethylene mixture may be mixed with the original natural or other gas in any suitable proportions to form an efficient combustion mixture for the carbon black apparatus. The composition of the ethane-ethylene mixture as well as the composition of the original gas will necessarily be factors in determining the proportion in which the two gases should be mixed.

Having described my invention what I claim is:

1. The process of producing carbon black which comprises cracking a hydrocarbon in the presence of methane and thereafter mixing said cracked mixture with a combustible gas.

2. The process of producing carbon black from methane which comprises mixing a crackable hydrocarbon with the methane, subjecting the mixture to a cracking temperature and thereafter burning the mixture to form carbon black.

3. The process of producing carbon black with methane which comprises mixing a crackable hydrocarbon with the methane, subjecting the mixture to a cracking temperature, adding the cracked mixture to further quantities of methane and thereafter burning to carbon black.

4. The process of producing carbon black by causing the cracking of hydrocarbons heavier than methane to take place in the presence of methane other than that which may be produced by the cracking of the heavy hydrocarbons and thereafter treating the gas mixture resulting from the cracking operation for the production of carbon black.

5. A process of increasing the yield of carbon black from natural gas composed chiefly of methane, which comprises cracking a mineral oil in the presence of said gas, and thereafter reacting upon the mixed gaseous product so produced to obtain carbon black.

6. The process of producing carbon black by cracking a mineral oil in the presence of methane over and above any resulting from the oil so cracked and thereafter treating the resulting gas mixture for the production of carbon black.

7. The process of producing carbon black which comprises charging a gas comprising methane with a mineral oil, subjecting the mixture to cracking conditions for cracking the oil, and thereafter decomposing said mixture under conditions adapted to produce carbon black.

8. The process of producing carbon black which comprises forming a mixture of methane and a vaporized mineral oil and cracking said oil in the presence of the said methane.

In testimony whereof I affix my signature.

EMERIC KROCH.